Figure 6:
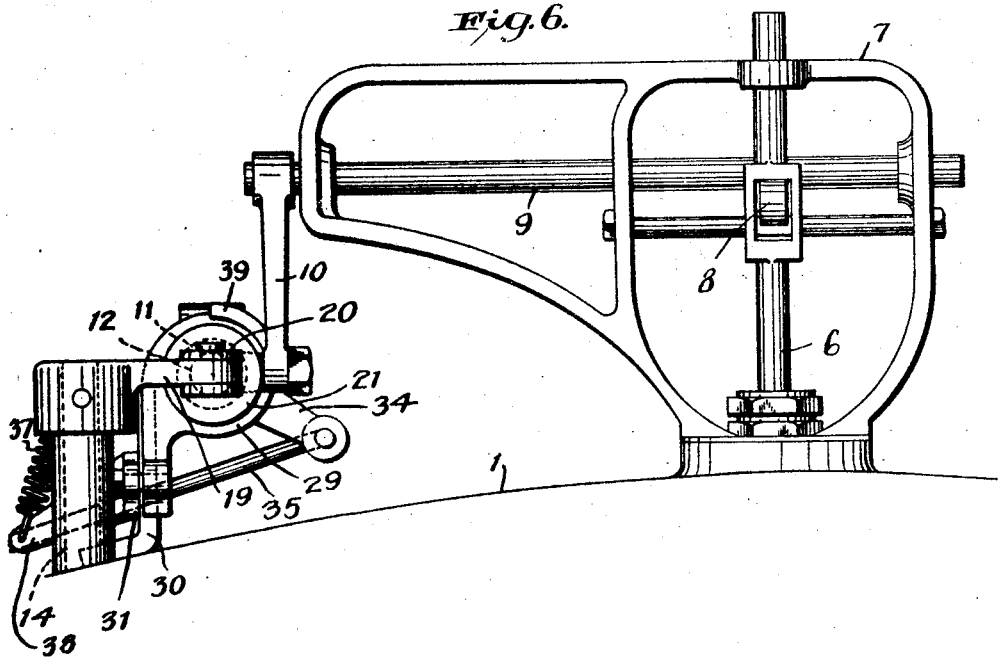

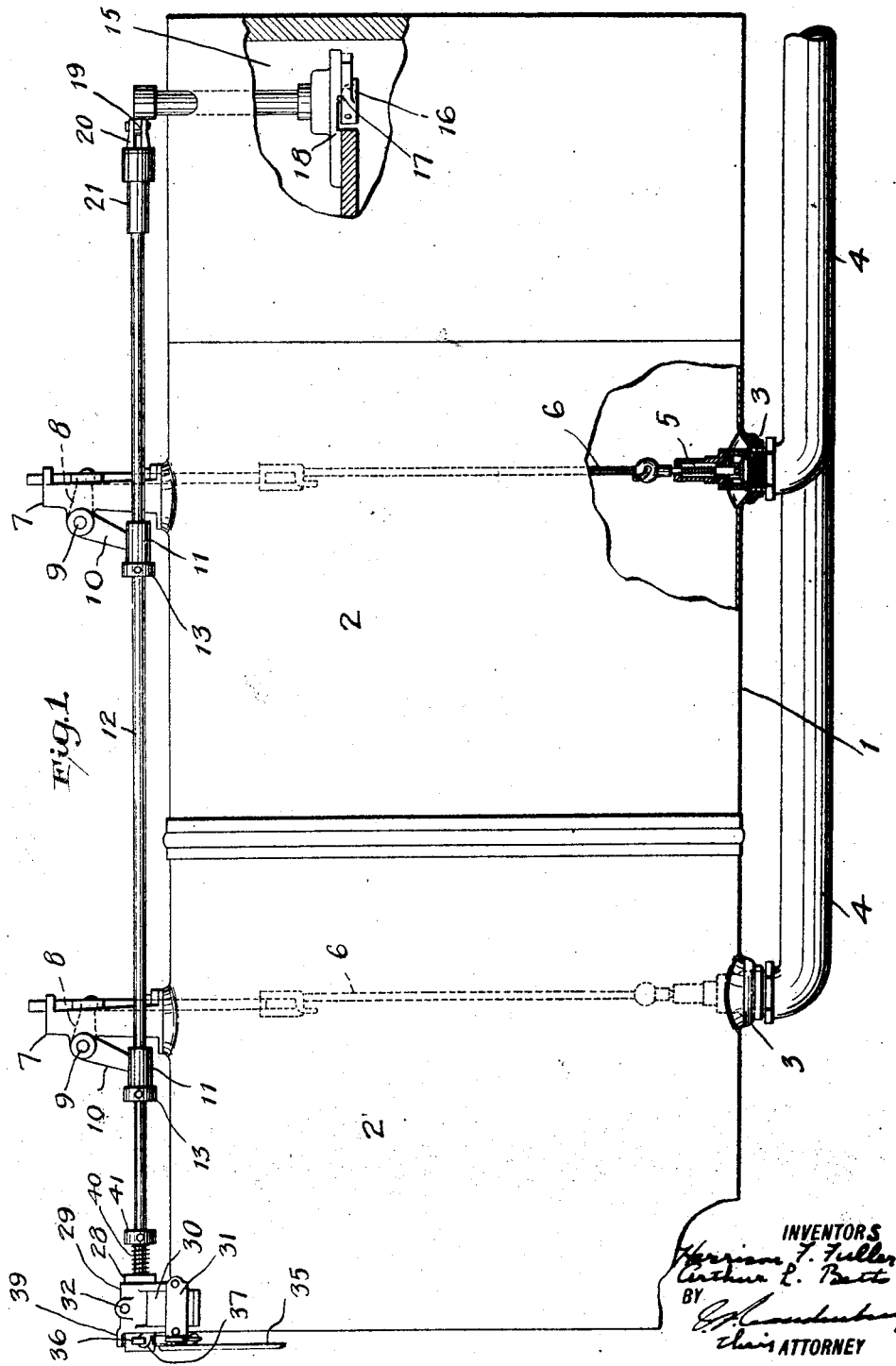

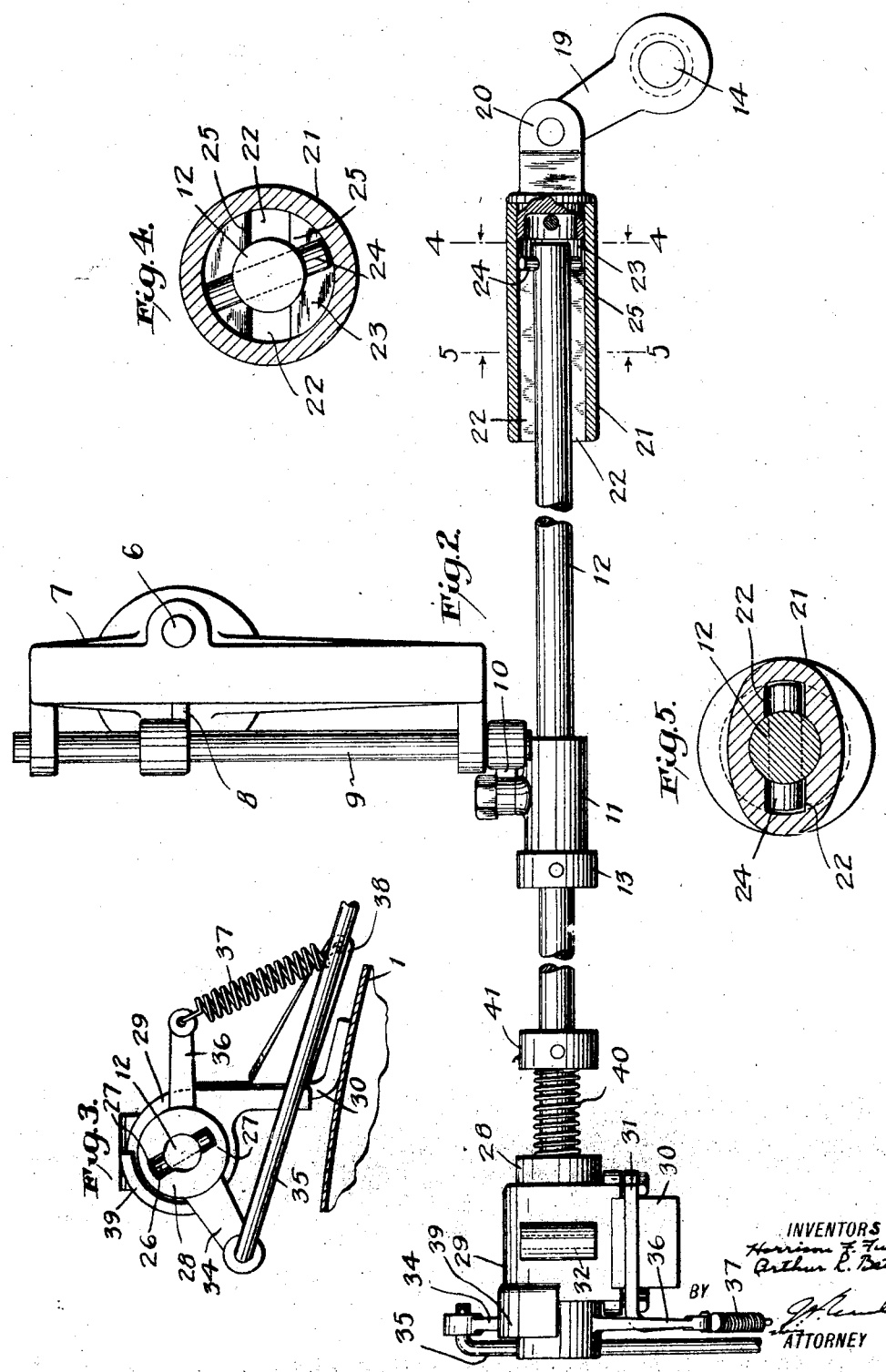

Dec. 22, 1925.  
H. F. FULLER ET AL  
VALVE MECHANISM  
Filed Sept. 20, 1923    3 Sheets-Sheet 3

1,566,472

INVENTORS  
Harrison F. Fuller  
Arthur L. Betts  
BY  
their ATTORNEY

Patented Dec. 22, 1925.

1,566,472

UNITED STATES PATENT OFFICE.

HARRISON F. FULLER, OF INDIANAPOLIS, INDIANA, AND ARTHUR L. BETTS, OF CINCINNATI, OHIO, ASSIGNORS TO AUGUSTINE DAVIS, JR., OF COVINGTON, KENTUCKY.

VALVE MECHANISM.

Application filed September 20, 1923. Serial No. 663,785.

*To all whom it may concern:*

Be it known that we, HARRISON F. FULLER and ARTHUR L. BETTS, citizens of the United States, and residents, respectively, of Indianapolis, in the county of Marion and State of Indiana, and of Cincinnati, in the county of Hamilton and State of Ohio, have invented a new and useful Valve Mechanism, of which the following is a specification.

The invention relates to valve mechanism, and more particularly to emergency valve mechanisms for tanks, such as oil tank wagon tanks. It is important that the bottom outlets of the compartments of these tanks be guarded by spring-seated emergency valves, and in these mechanisms the connections from such valves are connected to a longitudinal control rod, which is connected with operating and holding means at the rear end whereby the valves can be unseated to permit the drawing of oil or gasoline through the faucet pipes. The present invention is more particularly an improvement in means whereby the control rod can be released, by operation at a forward point or from the cab, from the holding means at the rear end, so as to cause the emergency valves to close independently of the regular operating mechanism, as in case of fire or collison.

The purpose of the invention is to provide a valve mechanism having these features which is of a simple, strong and reliable character, which does not require any very close adjustment or great accuracy in manufacture in order to insure the re-connection of the device after an emergency action, and which is weather-proof. The novel mechanism involves a control rod capable of two kinds of movement, namely longitudinal and rotary movements, with telescopic connections whereby movement of the rod effected at its forward end releases it from the rear connection.

Figures 7, 8:
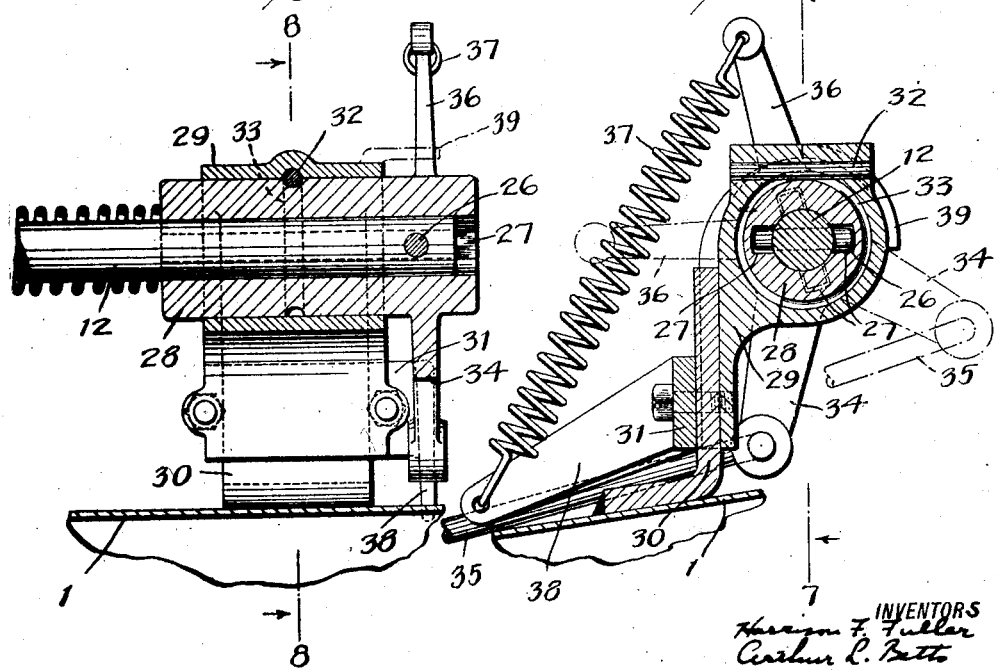

In the accompanying drawings illustrating the invention:

Fig. 1 is a side elevation of a compartmented tank-wagon tank and its bucket-box and valve mechanism, embodying the invention, with portions broken away; Fig. 2 is a top plan view of the mechanism involved in the invention, taken on a larger scale; Fig. 3 is an elevation of the parts shown in Fig. 2, looking from the left of said figure; Figs. 4 and 5 are cross-sectional views on a still larger scale, taken, respectively, on the lines 4—4 and 5—5 of Fig. 2; Fig. 6 is an end elevation looking from the right of Fig. 2; Fig. 7 is a longitudinal sectional view, taken on the line 7—7 of Fig. 8; and Fig. 8 is a cross-sectional view taken on the line 8—8 of Fig. 7.

The truck tank 1 is divided, as is customary, into separate compartments 2 for different kinds of oil or oil and gasoline. Each compartment has a bottom outlet 3, from which a pipe 4 leads rearward to the usual dispensing faucet, not shown. The valves are movable vertically within the lower part of the tank, and are adapted to be closed by springs 5. Operating connections 6 pass from the valves upward through the tank to brackets 7 on top, where, in the particular construction selected for illustration, they are adapted to be operated by arms 8 on transverse rock-shafts 9, the said shafts having depending arms 10 connected with longitudinal sleeves 11, all of which may be regarded as forming part of the valve connections.

A common control rod 12 extends through the sleeves 11 longitudinally of the top of the tank, at one side of its center. Collars 13 set on this rod, in front of the sleeves 11, provide, in connection with the latter, what may be termed one-side abutment, so that rearward draft of the rod will unseat the valves. While one-side abutment is sufficient for this purpose, and the construction is desirable because of its simplicity, it will be evident that this is not essential. It will be observed that the control rod is free to turn within the sleeves.

The operating and holding means at the rear end of the tank may be varied. In the construction illustrated there is a vertical rock-shaft 14, to the lower portion of which, within a bucket-box 15, is pinned an operating lever 16. The connection of this lever with the rock-shaft enables it to rotate the shaft, and at the same time permits it to tilt so that it may be engaged with and disengaged from a holding shoulder 17 on a fixed bracket 18. On the upper end of the vertical shaft is a crank arm 19 pivotally connected with a piece 20, which is fixed on the rear end of a sleeve 21.

This sleeve or telescopic connection member 21 receives the rear end of the control rod 12, and has longitudinal and transverse passages 22 and 23 to cooperate with a transverse pin or key 24 in the end of the rod. The pin 24 can move freely in the longitudinal grooves 22, but when the rod is in its relative rearward position and is turned so as to bring the pin out of line with the grooves 22 and into the lateral passage or chamber 23, so as to cooperate with the shoulder 25 afforded by this chamber, the parts are coupled with respect to longitudinal movement, so that operation of the lever 16 to draw rearward on the sleeve 21 will also effect rearward movement on the rod 12. If, however, the rod be turned so that the key will be in line with the longitudinal grooves, then the valve springs will be free to seat the valves and draw the rear end of the control rod forward in the sleeve 21.

At the forward end the control rod is provided with another pin or key 26, which is freely movable in longitudinal grooves or passages 27 of a rotatable bearing sleeve 28. This sleeve is rotatably mounted in a fixed bearing 29, which is carried by a bracket 30 fixed to the shell of the tank. A clamp connection 31 secures the bearing 29 to the vertical limb of this bracket, in a manner permitting of vertical adjustment to allow for different dimensions of tanks and positions of the mechanism thereon. A pin 32 in the fixed bearing cooperating with the circumferential groove 33 in the rotatable bearing retains the latter against longitudinal movement while permitting its free turning movement. An arm 34 on the rotatable bearing 28 enables this part to be turned by suitable operating means, represented by a pull rod 35. Another arm 36 on the sleeve serves for attachment of a spring 37, which holds the sleeve in its normal position, the opposite end of the spring being connected to a rigid arm 38 projecting from the clamp 31. A segmental flange 39 projecting from the fixed bearing 29 co-operates as a stop with the arms 34 and 36. The normal abutment of the arm 34 against the flange under the tension of the spring 37 causes the key 24 at the rear end of the rod to remain in the lateral chamber 23 of the sleeve 21 and out of line with the longitudinal grooves or passages 22.

A compression spring 40 interposed between the sleeve 28 and a collar 41 fixed to the control rod affords cushioned means for limiting the forward movement of the control rod under the action of the valve springs when the control rod is turned by the releasing means, which has been described, so as to uncouple it from the connection at the rear end.

In operation, the parts being in their normal relations, operation of the lever 16 will draw rearward the sleeve 21, and this in turn will pull the control rod 12, and through the collars 13 and sleeves 11 will operate the valve connections so as to unseat them against the tension of their springs 5. In this movement the key 26 at the forward end of the control rod slides freely in the longitudinal grooves 27 of the rotatable bearing 28. The valves being open, the lever 16 is engaged with the holding shoulder 17, so that the valves remain open. When the valves are to be closed in the ordinary way, the lever 16 is moved so as to disengage it from the holding shoulder, whereupon the valve springs will move the control rod 5 forward and close the valves. If a fire or other emergency should arise while the valves are open, making it necessary or desirable to close them from the forward end of the tank, the attendant pulls upon the rod 35. This partially rotates the sleeve 28, and through the key 26 and grooves 27 rotates the rod 12 within the sleeves 11 and 21. This brings the key 24 into line with the longitudinal passages 22 of the rear sleeve, whereupon the connection at this end is automatically uncoupled by the action of the valve springs, which project the rod 12 forward.

After such an operation, in order to reconnect the rear coupling, all that is necessary is to move the lever 16 in the valve-closing direction, which will move the sleeve 21 forward on the rod 12 until the chamber 23 comes to a position where it will permit the key 24 to be turned into engagement with the shoulder 25. At this moment the spring 37 acts automatically to turn the rod and effect the re-connection. The lengths of the sleeves 21 and 28 are such that the ends of the control rod do not pass out of engagement therewith.

The preferred form of the invention has been described in detail. The device is susceptible, however, of other embodiments, and there may be various changes in form, proportions, and arrangement, and in respect to substitutions, additions, omissions and reversals. Considered broadly, the invention provides a two-movement control rod, one movement of the rod serving to unseat the valves through the action of the operating and holding mechanism at the rear end, and the other movement serving to release the rear end of the rod from such mechanism to enable the valves to be closed from the front in case of emergency. The two movements referred to are longitudinal movement and rotary movement of the rod about its longitudinal axis. The associated connections and operating devices may be varied within the scope of the invention as defined in the claims.

What is claimed as new is:

1. In a tank having an outlet or outlets and a spring-closed valve or valves therefor, a longitudinal control rod capable of two kinds of movement, namely longitudinal and rotary, valve connections related to the control rod so as to be operated by the movement of the one kind, operating and holding means related to the control rod in respect to the said kind of movement, and means related to the control rod at another point so as to be capable of effecting the other kind of movement thereof to release it and the valves from the holding means.

2. In a tank having an outlet or outlets and a spring-closed valve or valves therefor, a longitudinal control rod capable of longitudinal and rotary movements, valve connections related to the control rod so as to be operated by the longitudinal movement, operating and holding mechanism operatively related to the rod at its rear part in respect to such movement, and means related to the forward part of the rod so as to be capable of turning the same whereby to effect its release from the mechanism at the rear.

3. In a tank having an outlet or outlets and a spring-closed valve or valves therefor, a longitudinal control rod capable of two kinds of movement, namely longitudinal and rotary, valve connections relate to the conrtol rod so as to be operated by the movement of one kind, operating and holding means for the rod having a connection telescopic with the rear portion of the rod and formed with passages permitting release of the rod from said connection when the rod is given the second kind of movement, and releasing means related to the forward part of the control rod in a manner to produce such movement.

4. In a tank having an outlet or outlets and a spring-closed valve or valves therefor, a longitudinal control rod capable of two kinds of movement, namely longitudinal and rotary, valve connections related to the control rod so as to be operated by the movement of one kind, operating and holding means for the rod having a connection telescopic with the rear portion of the rod and formed with passages permitting release of the rod from said connection when the rod is given the second kind of movement, and a releasing device telescopic with the forward portion of the rod and adapted to effect such movement.

5. In a tank having an outlet or outlets and a spring-closed valve or valves therefor, a longitudinal control rod capable of longitudinal and rotary movements, valve connections related to the control rod so as to be operated by the longitudinal movement, operating and holding mechanism at the rear, a telescopic connection between the rod and said mechanism having a key and passages whereby the rod can be disconnected by turning, and a releasing device at the forward part of the rod adapted to turn the same while permitting the longitudinal movement.

6. In a tank having an outlet or outlets and a spring-closed valve or valves therefor, a longitudinal control rod capable of longitudinal and rotary movements, valve connections related to the control rod so as to be operated by the longitudinal movement, operating and holding mechanism at the rear, a telescopic connection between the rod and said mechanism having a key and passages whereby the rod can be disconnected by turning, a bearing for the forward portion of the rod permitting free longitudinal movement thereof, and means whereby to turn said bearing to turn the rod in order to release it from the connection at the rear end.

7. In a tank having an outlet or outlets and a spring-closed valve or valves therefor, a longitudinal control rod capable of longitudinal and rotary movements, valve connections related to the control rod so as to be operated by the longitudinal movement, operating and holding mechanism at the rear, a telescopic connection between the rod and said mechanism having a key and passages whereby the rod can be disconnected by turning, a fixed bearing at the forward part of the rod, and a rotatable bearing therein with means for turning the rotatable bearing, the rod and rotatable bearing having longitudinal formations permitting free relative longitudinal movement but compelling them to rotate together when the bearing is turned to release the rod from the rear connection.

8. In a tank having an outlet or outlets and a spring-closed valve or valves therefor, a longitudinal control rod capable of longitudinal and rotary movements, valve connections having one-side abutment with the control rod so as to be unseated by longitudinal movement of the rod, operating and holding mechanism operatively related to the rod at its rear part in respect to such movement, means related to the forward part of the rod so as to be capable of turning the same whereby to effect its release from the mechanism at the rear, and cushion means for limiting the travel of the rod when thus released.

HARRISON F. FULLER.
ARTHUR L. BETTS.